(12) United States Patent
Cliche et al.

(10) Patent No.: US 12,250,125 B1
(45) Date of Patent: Mar. 11, 2025

(54) SYSTEM FOR MACHINE LEARNING-BASED METADATA COLLECTION AND PARAMETERIZED GRAPH MODELING FROM COMMUNICATION CHANNELS

(71) Applicant: BANK OF AMERICA CORPORATION, Charlotte, NC (US)

(72) Inventors: Robert Cliche, New York, NY (US); Gilbert Gatchalian, Union, NJ (US); Shobha Jacob, Lisle, IL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/507,604

(22) Filed: Nov. 13, 2023

(51) Int. Cl.
*H04L 41/12* (2022.01)
*H04L 41/16* (2022.01)

(52) U.S. Cl.
CPC .............. *H04L 41/12* (2013.01); *H04L 41/16* (2013.01)

(58) Field of Classification Search
CPC ................................ H04L 41/12; H04L 41/16
See application file for complete search history.

(56) References Cited

U.S. PATENT DOCUMENTS

| | | | |
|---|---|---|---|
| 7,917,506 B2 | 3/2011 | Kolpak | |
| 8,015,209 B2 | 9/2011 | Kassan | |
| 8,140,588 B2 | 3/2012 | Salo | |
| 8,332,782 B1 | 12/2012 | Chang | |
| 10,867,036 B2 | 12/2020 | Komarek | |
| 11,443,198 B1 | 9/2022 | Chen | |
| 11,475,161 B2 | 10/2022 | Zheng | |
| 11,489,666 B2 | 11/2022 | Bergeron | |
| 2016/0071152 A1 | 3/2016 | Nicklin | |
| 2016/0253689 A1* | 9/2016 | Milton | G06Q 30/02 705/7.34 |
| 2018/0040011 A1* | 2/2018 | Milton | H04W 4/029 |
| 2018/0154899 A1* | 6/2018 | Tiwari | B60W 50/082 |
| 2020/0211375 A1* | 7/2020 | Vig | G01S 7/412 |
| 2020/0225655 A1* | 7/2020 | Cella | G05B 19/41875 |
| 2021/0027182 A1 | 1/2021 | Harris | |
| 2021/0097628 A1 | 4/2021 | Kolls | |
| 2021/0357815 A1 | 11/2021 | Anderson | |

(Continued)

FOREIGN PATENT DOCUMENTS

WO 2006038391 A1 4/2006

*Primary Examiner* — Minh Chau Nguyen
(74) *Attorney, Agent, or Firm* — Moore & Van Allen PLLC; Mike Papakonstantinou (57) ABSTRACT

Systems, computer program products, and methods are described herein for machine learning-based metadata collection and parameterized graph modeling from communication channels. The present disclosure comprises a communication interaction subsystem (CIS) configured to receive requests from a user input device to query network traffic data associated with a plurality of devices. The request comprises a factor set and a correlation criteria. The CIS analyzes the network traffic data based on at least the request and determines a subset of the plurality of devices based on at least the request. The system also comprises a parameterized graph modeling subsystem (PGMS) operatively coupled to the CIS, which is configured to generate a data traffic topography map associated with the subset of the plurality of devices and transmit control signals configured to cause the user input device to display the data traffic topography map.

20 Claims, 4 Drawing Sheets

(56) References Cited

U.S. PATENT DOCUMENTS

| | | |
|---|---|---|
| 2022/0092464 A1 | 3/2022 | Wistuba |
| 2022/0253485 A1 | 8/2022 | Johnson |
| 2022/0277219 A1 | 9/2022 | Tora |
| 2022/0385635 A1 | 12/2022 | Thimmisetty |
| 2023/0088431 A1 | 3/2023 | Bychkovsky |
| 2023/0306059 A1 | 9/2023 | Monk |
| 2024/0012868 A1 | 1/2024 | Silkey |

\* cited by examiner

SYSTEM FOR MACHINE LEARNING-BASED METADATA COLLECTION AND PARAMETERIZED GRAPH MODELING FROM COMMUNICATION CHANNELS

TECHNOLOGICAL FIELD

Example embodiments of the present disclosure relate to machine learning-based metadata collection and parameterized graph modeling from communication channels.

BACKGROUND

Contemporary digital communication platforms generate an extensive amount of network traffic data, which presents a complex challenge when trying to assess the quality of relationships between individuals and organizations. Traditional analysis methods are inadequate for processing the vast, varied, and dynamic nature of such data, resulting in inefficiencies in relationship management and resource allocation.

Applicant has identified a number of deficiencies and problems associated with modeling network connections from communication channels. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for machine learning-based metadata collection and parameterized graph modeling from communication channels.

In one aspect, a system for machine learning-based metadata collection and parameterized graph modeling from communication channels is presented. The system comprising: a communication interaction subsystem (CIS) configured to: receive, from a user input device, a request to query network traffic data associated with a plurality of devices, wherein the request comprises a factor set and a correlation criteria; analyze the network traffic data based on at least the request; and determine a subset of the plurality of devices based on at least the request; and a parameterized graph modeling subsystem (PGMS) operatively coupled to the CIS, wherein the PGMS is configured to: generate a data traffic topography map associated with the subset of the plurality of devices; and transmit control signals configured to cause the user input device to display the data traffic topography map.

In some embodiments, the system further comprising an interaction assessment subsystem (IAS) operatively coupled to the CIS and PGMS, wherein the IAS is configured to: determine a network correlation index associated with the subset of the plurality of devices based on at least the correlation criteria; and overlay the network correlation index on the data traffic topography map.

In some embodiments, determining the network correlation index further comprises: capturing metadata associated with the network traffic data; determining contents associated with the network traffic data; executing sentiment analysis on at least one of the metadata associated with the network traffic data or the contents associated with the network traffic data; and determining the network correlation index based on at least executing the sentiment analysis.

In some embodiments, the metadata comprises at least one of source and destination IP addresses, ports, timestamps, or protocols.

In some embodiments, contents comprise information associated with a payload of network packets being transmitted in the network traffic data, wherein the information associated with a payload of network packets comprises at least one of email messages, text messages, calendar appointments, phone call transcripts, conference call transcripts, instant messages, organizational documentation, enterprise management system documentation, document repositories, virtual meetings participation, virtual meeting transcripts, physical meeting attendance documentation, and/or publications.

In some embodiments, the correlation criteria comprises at least one of a time element, recency of interactions, quality of interactions, frequency of interactions, number of interactions, positivity of interactions, depth of communications, consistency of communications, mutual initiatives, conflict resolution, sentiment analysis, non-verbal cues in communications, and/or skills.

In some embodiments, the PGMS is further configured to: receive, from the user input device, a feedback input specifying adjustments to at least one of the factor set or the correlation criteria; dynamically generate an alternate version of the data topography map with the adjusted factor set and the adjusted correlation criteria; and transmit control signals configured to cause the user input device to display the alternate version of the data traffic topography map.

In another aspect, a computer program product for machine learning-based metadata collection and parameterized graph modeling from communication channels, the computer program product comprising a non-transitory computer-readable medium comprising code configured to cause an apparatus to: receive, from a user input device, a request to query network traffic data associated with a plurality of devices, wherein the request comprises a factor set and a correlation criteria; analyze the network traffic data based on at least the request; determine a subset of the plurality of devices based on at least the request; generate a data traffic topography map associated with the subset of the plurality of devices; and transmit control signals configured to cause the user input device to display the data traffic topography map.

In yet another aspect, a method for machine learning-based metadata collection and parameterized graph modeling from communication channels, the method comprising: receiving, from a user input device, a request to query network traffic data associated with a plurality of devices, wherein the request comprises a factor set and a correlation criteria; analyzing the network traffic data based on at least the request; determining a subset of the plurality of devices based on at least the request; generating a data traffic topography map associated with the subset of the plurality of devices; and transmitting control signals configured to cause the user input device to display the data traffic topography map.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

In today's dynamic business landscape, building strong and reliable business relationships is crucial for entity-wide success. Cultivating these relationships demands significant investments in time, resources, and collaborative knowledge management, both within and beyond the entity. Often, employees rely on manual processes and word-of-mouth communication to identify and assess existing entity-wide (and beyond) relationships. However, comprehending the intricate network of relationships through network activity monitoring is challenging due to the lack of documented data, fragmented data sources, and the absence of targeted network analysis. The evolving work environment, characterized by remote work arrangements, hybrid collaborations, and an increased reliance on virtual interactions, further complicates this task, highlighting the critical need to evaluate network activity between devices. Without this valuable insight, organizations face difficulties in understanding and managing their network of relationships. As digital network interactions become more frequent and influential, these challenges are likely to intensify.

Contemporary digital communication platforms generate an extensive amount of network traffic data, which presents a complex challenge when trying to assess the quality of relationships between individuals and organizations. Traditional analysis methods are inadequate for processing the vast, varied, and dynamic nature of such data, resulting in inefficiencies in relationship management and resource allocation.

Embodiments of the invention address these challenges by collecting network traffic data from interactions between internal and external devices, analyzing the data with advanced machine learning techniques, including sentiment analysis and statistical modeling. Upon analyzing the data, embodiments of the invention employ these methodologies to develop a parameterized graph that quantifies the value of relationships and to construct a real-time results map for strategic utilization.

Figure 1A:
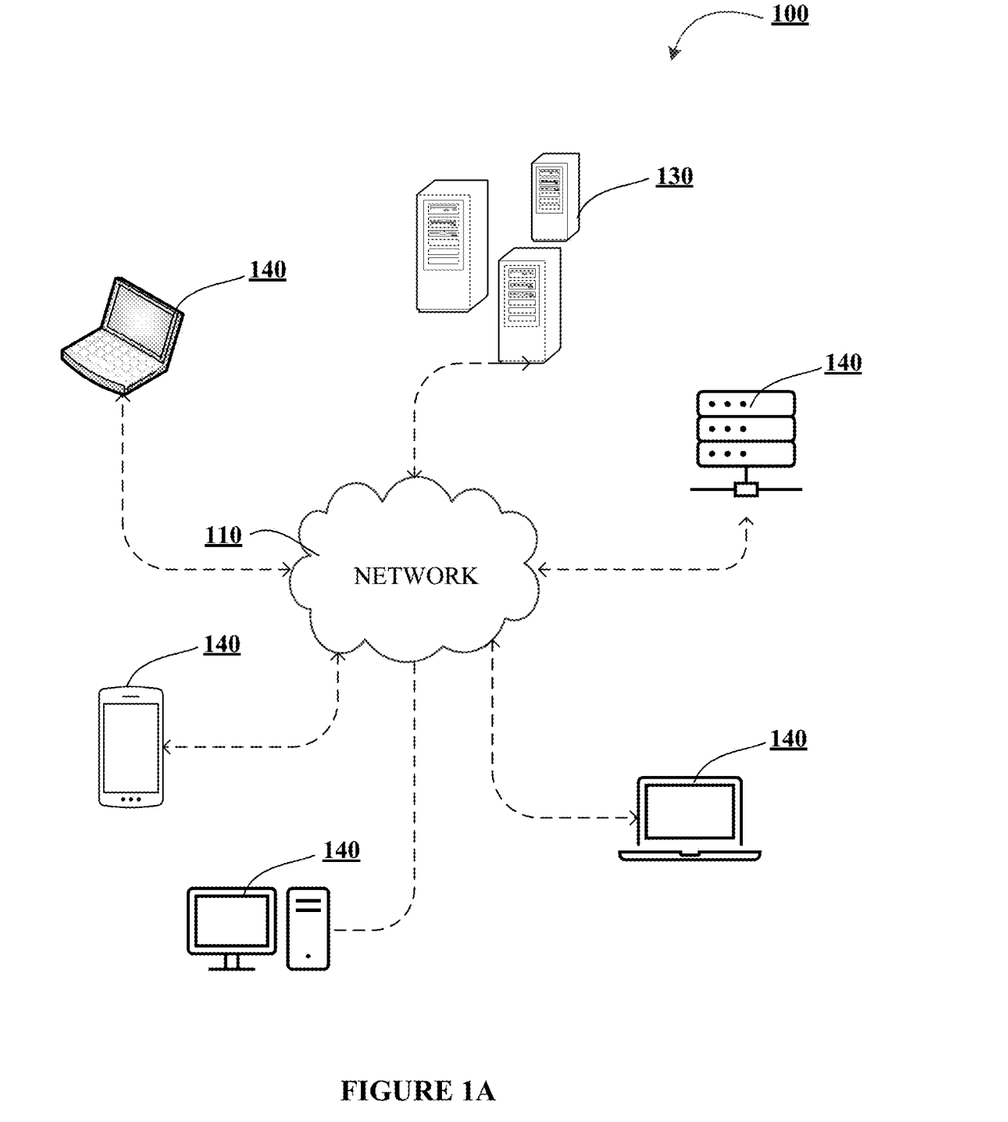
FIGS. 1A-1C illustrates technical components of an exemplary distributed computing environment for machine learning-based metadata collection and parameterized graph modeling from communication channels, in accordance with an embodiment of the disclosure.
Figure 1B:
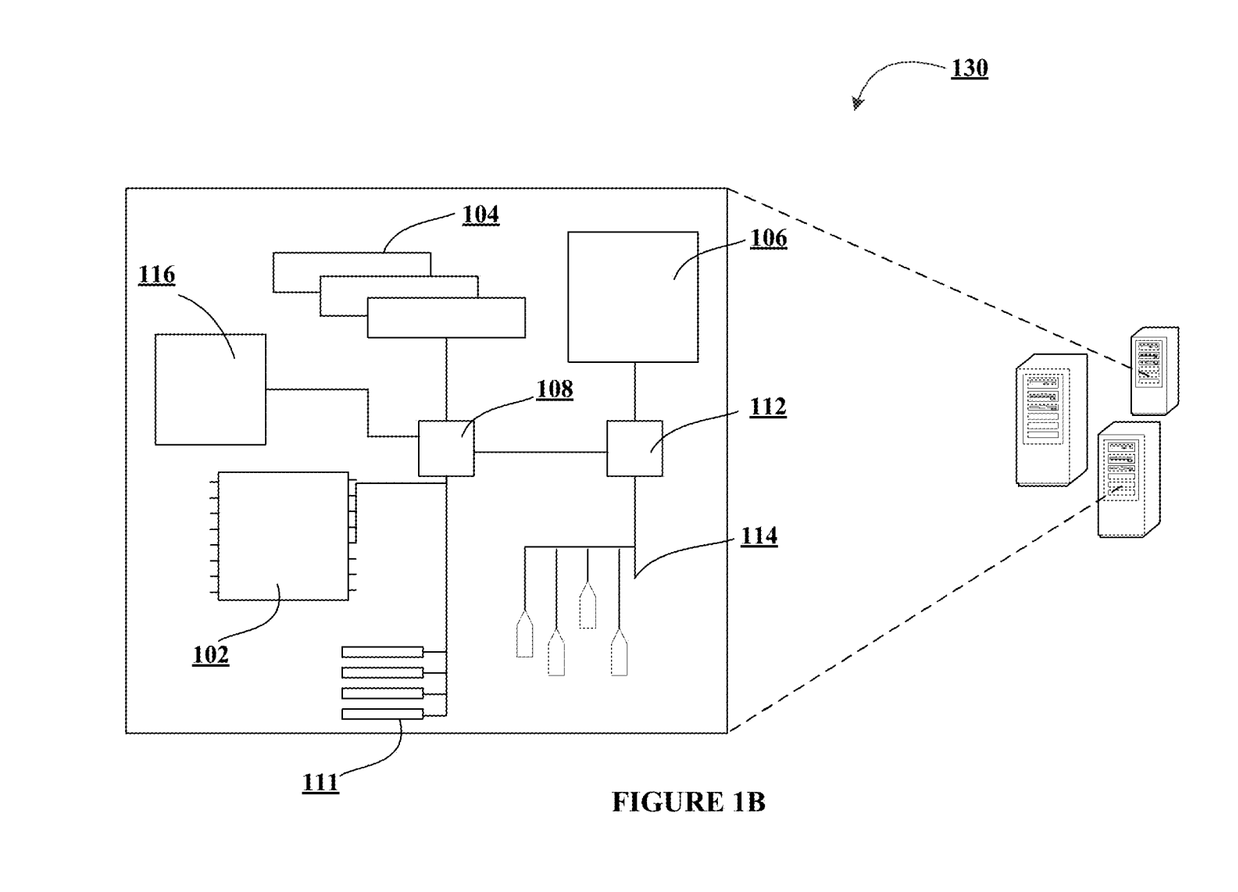
Figure 1C:
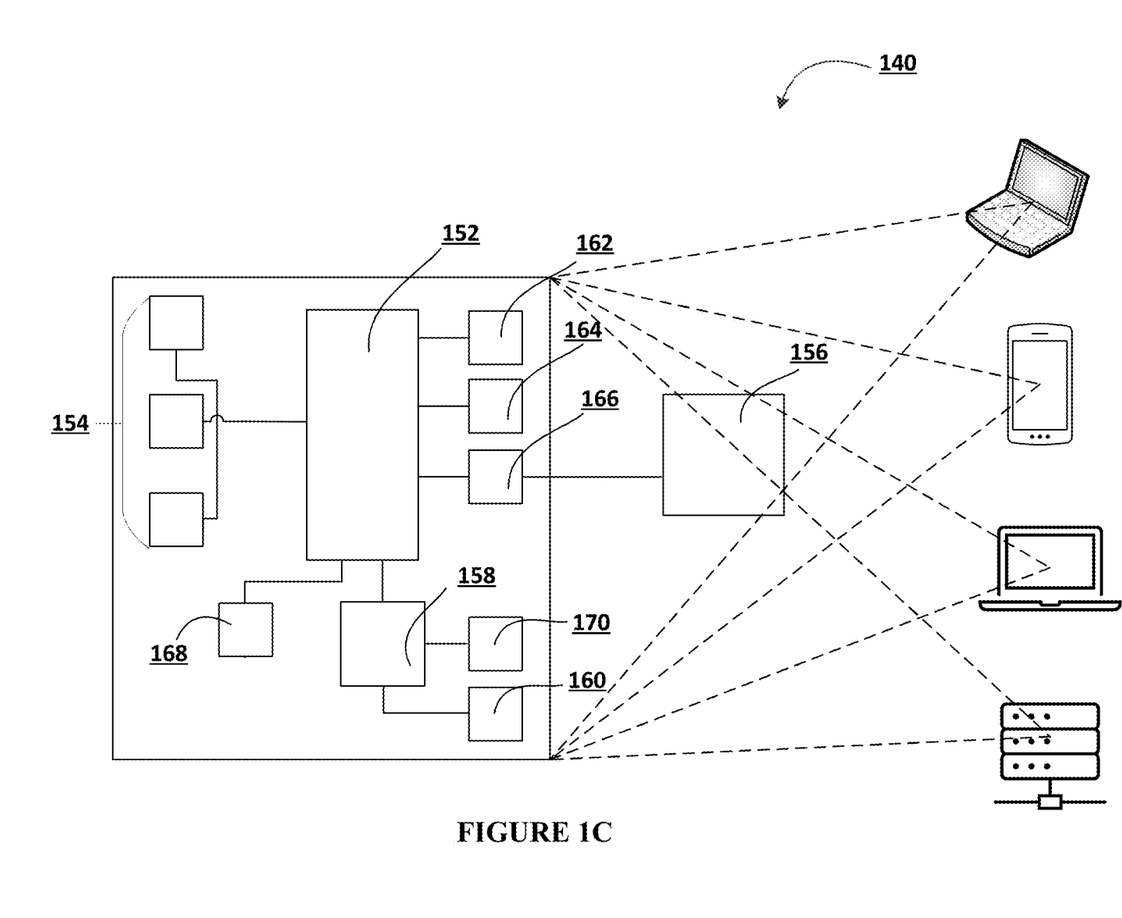

FIGS. 1A-1C illustrate technical components of an exemplary distributed computing environment for system for machine learning-based metadata collection and parameterized graph modeling from communication channels 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 may include or be operatively coupled to a number of subsystems to execute the portions of processes described herein. A subsystem may refer to a distinct functional unit within a system, designed to perform a specific function or set of functions. In various embodiments, a subsystem may comprise both hardware and software components that work in concert to achieve the designated tasks. For example, in some embodiments, a "subsystem" may include processing circuitry, algorithms, routines, storage media, network interfaces, input/output mechanisms, and the like. In some embodiments, each subsystem may include one or more units, each designed to perform a specific function or set of functions within the broader scope of the subsystem's objectives. These units may utilize the processing circuitry, algorithms, routines, storage media, network interfaces, and input/output mechanisms associated with the subsystem to execute their designated tasks. In some embodiments, subsystem may operate independently or in conjunction with other subsystems to achieve system-wide objectives. In some cases, similar or common hardware may be shared across multiple subsystems, obviating the need for duplicate hardware. Components of a subsystem may be housed together or separately, depending on system architecture and functional requirements.

In an example embodiment, the processor 102 may include or be operatively coupled to a communication interaction subsystem (CIS). The CIS may function as an integration hub for collecting, receiving, and processing network traffic data queries. The CIS may be responsible for interfacing with user input devices, acquiring network traffic data using various capturing techniques, and storing such data within selected databases for further action and analysis. In this way, the CIS supports the operational needs for structured and unstructured data retrieval and usage analysis.

In another example embodiment, the processor 102 may include or be operatively coupled to a Parameterized Graph Modeling Subsystem (PGMS). The PGMS may generate visual representations of network traffic data, referred to herein as data traffic topography maps. These maps detail the volume and pathways of communication between devices. Additionally, the PGMS may adjust the visual representation in response to user feedback, dynamically altering the map based on changes in analysis criteria, such as factor sets and correlation criteria.

In yet another example embodiment, the processor 102 may include or be operatively coupled to an Interaction Assessment Subsystem (IAS). The IAS may analyze the network traffic data to extract metadata and content insights. In this regard, the IAS may employ machine learning and natural language processing techniques to execute sentiment and contextual analyses of communication exchanges, assigning quantitative scores to interactions based on an array of factors, and deriving a network correlation index. In addition, the IAS may overlay the network correlation index onto data traffic topography maps to quantify the communication dynamics and patterns.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2:
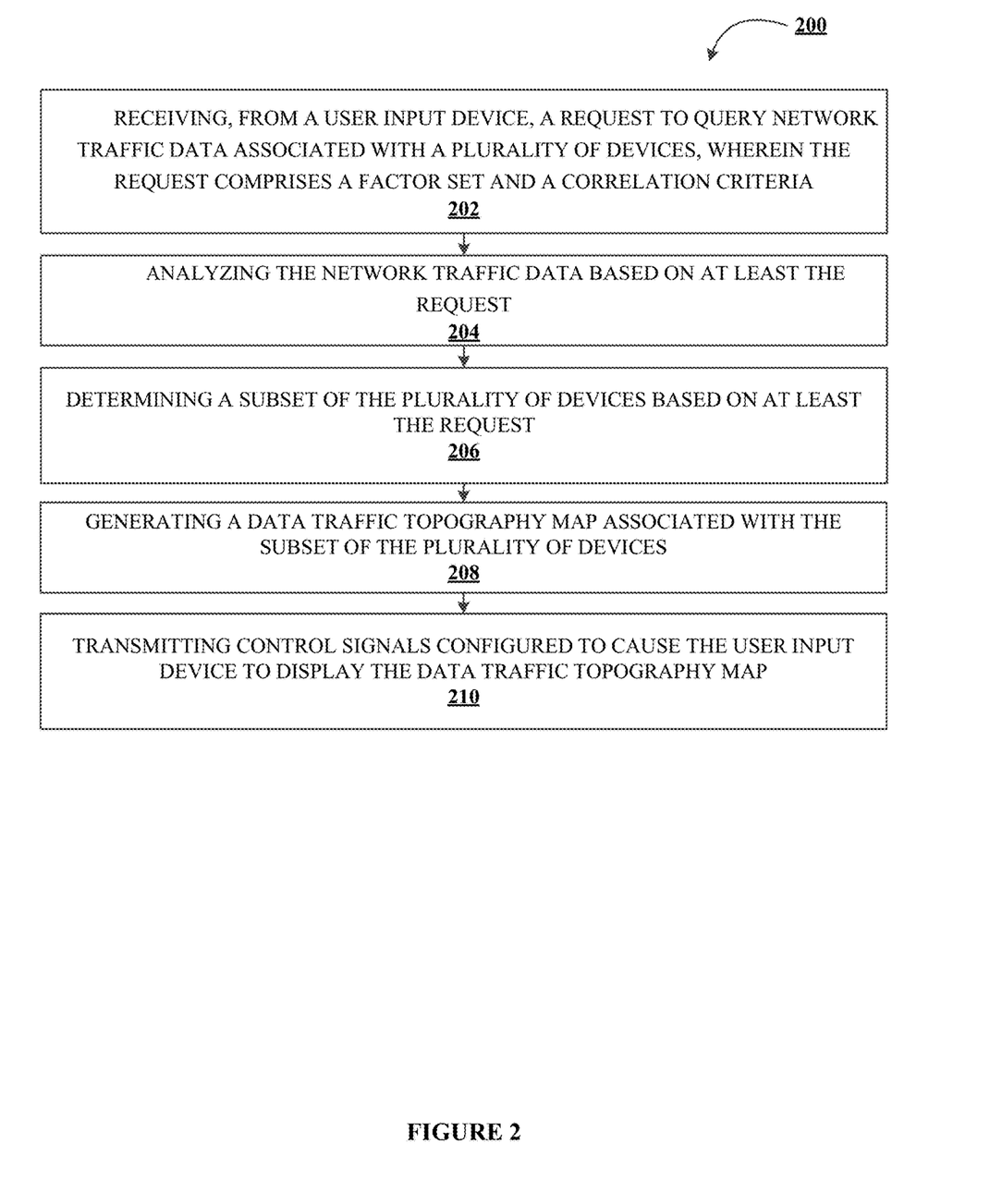
FIG. 2 illustrates a process flow for machine learning-based metadata collection and parameterized graph modeling from communication channels, in accordance with an embodiment of the disclosure.

FIG. 2 illustrates a process flow 200 for machine learning-based metadata collection and parameterized graph modeling from communication channels, in accordance with an embodiment of the disclosure. As shown in block 202, the process flow includes receiving, from a user input device, a request to query network traffic data associated with a plurality of devices, wherein the request comprises a factor set and a correlation criteria.

The network traffic data may include a comprehensive record of all digital interactions that traverse a given network, capturing details such as the source and destination of data packets, timestamps, payload sizes, protocol information, and/or the like. Network traffic data may be used to extract insights into the device-level relationships, user-level relationships, usage patterns, performance, and security of the network, as well as the behavior of the users and applications that depend on it. In some embodiments, the CIS may be configured to capture network traffic data using techniques such as packets sniffers, network test access points (TAPs), switch port analyzers (SPAN) ports, network probes, packet capture solutions, information scrapers, flow data analysis, deep packet inspection (DPI), and/or the like.

Once network traffic data is acquired, the CIS may be configured to store the network traffic data in a database. The selection of a database type may depend on the specific needs of data structuring and retrieval. For instance, a relational database may be used to store data in a structured format, suitable for environments that require robust transactional integrity and sophisticated query capabilities. In contrast, a NoSQL database may be favored for its scalability and flexibility in storing large volumes of unstructured or semi-structured data, which may be advantageous for rapid development and handling of data of varying types and complexities. In example embodiments, the database where the network traffic data is stored may provide a repository for further actions and analyses. For instance, such a repository may allow for the historical analysis of communication patterns, providing insights into the dynamics and the quality of interaction over time, which may include metadata extraction, frequency analysis, relationship valuation, and/or the like.

As described herein, the CIS may be configured to interface with end-point devices (e.g., the user input device), facilitating processing of network traffic data requests therefrom. As described herein, such a request may include a factor set and a correlation criteria.

In some embodiments, a factor set may include network parameters such as identifiers of user input devices, types of digital communication (such as emails, instant messages, or data transfers), specific time frames, the nature of the devices' interactions, and/or the like. The granularity of the factor set allows for efficient analysis of network traffic data to support a focused and efficient data processing operation.

In some embodiments, correlation criteria may be used to identify patterns, frequencies, and other statistical relationships within the network traffic data, according to the factor set provided in the request. The correlation criteria may serve as a basis for discerning relevant connections and derive actionable insights from the network traffic data and associated communication channels being monitored. By applying these correlation criteria, the quality, depth, and significance of interactions between the devices included in the network traffic data may be assessed, which, in turn, may aid in the creation of a comprehensive data traffic topography map that visually represents these relationships.

In an example embodiment, the correlation criteria may include a time element-specific timestamps or date ranges pertinent to network interactions, offering a chronological context for the activity analyzed, recency of interactions—how current or recent the communication data is, which can be useful for dynamic analysis that prioritizes timeliness, quality of interactions—an evaluation of the interaction's constructive nature or relevance to predefined objectives, frequency of interactions-how often communication occurs between devices, which can suggest the intensity or priority of a relationship, number of interactions-a quantitative measure of engagement by enumerating the total instances of communication, positivity of interactions-gauged by assessing the presence of positive sentiment or favorable outcomes in communications, which may indicate a beneficial rapport among parties, depth of communications-assessed by examining the substantiality or complexity of the interactions, moving beyond superficial exchanges to measure the thoroughness of the conversation, consistency of communications—regularity or variability of communication patterns over time, which may reflect the stability or fluctuation in dialogue dynamics, mutual initiatives—the extent to which interacting parties reciprocally engage in initiating communications, offering a view into the collaborative or interactive dynamic of the relationships, conflict resolution—the efficacy with which disputes or disagreements are navigated and resolved within communication data, potentially revealing problem-solving strategies employed by the participants, sentiment analysis—understanding the emotional tone and subjective content conveyed in communications to interpret attitudes or moods, non-verbal cues in communications—images, videos, emojis, and other forms of non-text communication, skills, and/or the like.

As shown in block 204, the process flow includes analyzing the network traffic data based on at least the request. In some embodiments, analysis of network traffic data may refer to examining the data that is sent and received over a network to understand and derive meaningful information based on the request. To this end, the CIS may be configured to filter the data to focus on relevant interactions of network traffic data that correspond with the factor set and correlation criteria established by the user request. In example embodiments, filtering the network traffic data may involve parsing through extensive datasets to isolate instances of communication pertinent to the request based on the factor set and correlation criteria. Accordingly, when the request is initiated, the CIS may be configured to scrutinize the network traffic data to discern patterns, relationships, or specific instances of communication that fall within the scope of the user's inquiry.

As shown in block 206, the process flow includes determining a subset of the plurality of devices based on at least the request. Upon analyzing the network traffic data, the CIS may be configured to identify a subset of devices that are associated with the relevant interactions.

As shown in block 208, the process flow includes generating a data traffic topography map associated with the subset of the plurality of devices. Upon receiving the subset of the plurality of devices associated with the relevant interactions, the PGMS may be configured to generate a data traffic topography map using a combination of graph-based clustering algorithms and link analysis algorithms. In example embodiments, the data traffic topography map may be a visual representation depicting interaction pathways and communication volumes between the subset of the plurality of devices.

Once the data traffic topography map is generated, the IAS may be configured to determine a network correlation index associated with the subset of the plurality of devices based on at least the correlation criteria. In this regard, the IAS may be configured to capture metadata associated with the network traffic data. In example embodiments, the metadata may include fundamental identifiers and quantifiers of network activity such as source and destination IP addresses, port numbers, timestamps, protocol information, and/or the like to establish a baseline of how, when, and where communications occur within the network. In addition, the IAS may be configured to determine contents associated with the network traffic data. In example embodiments, the contents may include information associated with a payload of network packets being transmitted in the network traffic data. Here, the information associated with a payload of network packets may include email messages, text messages, calendar appointments, phone call transcripts, conference call transcripts, instant messages, organizational documentation, enterprise management system documentation, document repositories, virtual meetings participation, virtual meeting transcripts, physical meeting attendance documentation, publications, and/or the like.

Upon capturing the metadata associated with the network traffic data and determining the contents associated with the network traffic data, the IAS may be configured to execute sentiment analysis on at least one of the metadata associated with the network traffic data or the contents associated with the network traffic data. In some embodiments, the IAS may be configured with machine learning capabilities to process and analyze network traffic data for extracting meaningful insights from communication exchanges. To this end, the IAS may be configured to apply natural language processing (NLP) techniques to perform advanced linguistic analyses, including the context in which communications occur, the intent behind the messages, and the inherent sentiment. In addition, the IAS may be configured to execute sentiment analysis to ascertain the tone and subjective qualities in communications. The sentiment analysis may evaluate the positivity, negativity, or neutrality of interactions to understand the emotional dynamics between communicating parties. Beyond sentiment, in some embodiments, the IAS may be configured to implement contextual analysis to understand the situations surrounding communication events. Contextual analysis may involve interpreting the relevance of the time element, recency, frequency, and number of interactions. In addition, contextual analysis may also consider the depth and consistency of communications, ensuring that the sentiment analysis is informed by the situation in which the interaction takes place.

Upon executing the sentiment and contextual analysis, the IAS may be configured to determine the network correlation index. To this end, the IAS may be configured to implement a quantitative scoring mechanism to convert each sentiment and contextual assessment across related interactions into corresponding scores. In some embodiments, these scores may be normalized and scaled to create uniformity in analysis, facilitating the comparison across different sets of data. Upon normalizing and scaling the individual scores, the IAS may be configured to determine the network correlation index by aggregating the scores reflecting the integrated sentiment and contextual insights. In some embodiments, aggregating the scores may include weighting each score and determining the network correlation index as an aggregated measure of the weighted scores. In this regard, each score may be weighted based on a relevance, frequency, intensity, contextual significance, impact, specificity, temporal aspects, sentiment source, novelty, and/or the like.

In response to determining the network correlation index, the IAS may be configured to overlay the network correlation index on the data traffic topography map. In some embodiments, the overlay may involve superimposing the quantified indices over the mapped representation of network communications between devices to visualize the strength of connections and the relative importance or influence of various nodes based on their interaction patterns. In example embodiments, the visual distinction on the map may be achieved through varying the thickness of lines, changing colors, altering the size of nodes (e.g., device) corresponding to the value of the network correlation index, and/or the like.

As shown in block 210, the process flow includes transmitting control signals configured to cause the user input device to display the data traffic topography map. In some other embodiments, the PGMS may be configured to receive, from the user input device, a feedback input specifying adjustments to the factor set or the correlation criteria. Upon reception of such input, the PGMS may be configured to dynamically generate an alternate version of the data topography map with the adjusted factor set and the adjusted correlation criteria. In response, the PGMS may be configured to transmit control signals configured to cause the user input device to display the alternate version of the data traffic topography map.

Embodiments of the present disclosure are described below with reference to block diagrams and flowchart illustrations. Thus, it should be understood that each block of the block diagrams and flowchart illustrations may be implemented in the form of a computer program product; an entirely hardware embodiment; an entirely firmware embodiment; a combination of hardware, computer program products, and/or firmware; and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for machine learning-based metadata collection and parameterized graph modeling from communication channels, the system comprising:
    a communication interaction subsystem (CIS) configured to:
        receive, from a user input device, a request to query network traffic data associated with a plurality of devices, wherein the request comprises a factor set and a correlation criteria;
        analyze the network traffic data based on at least the request; and
        determine a subset of the plurality of devices based on at least the request; and
    a parameterized graph modeling subsystem (PGMS) operatively coupled to the CIS, wherein the PGMS is configured to:
        generate a data traffic topography map associated with the subset of the plurality of devices; and
        transmit control signals configured to cause the user input device to display the data traffic topography map.

2. The system of claim 1, further comprising an interaction assessment subsystem (IAS) operatively coupled to the CIS and PGMS, wherein the IAS is configured to:
    determine a network correlation index associated with the subset of the plurality of devices based on at least the correlation criteria; and
    overlay the network correlation index on the data traffic topography map.

3. The system of claim 2, wherein determining the network correlation index further comprises:
    capturing metadata associated with the network traffic data;
    determining contents associated with the network traffic data;
    executing sentiment analysis on at least one of the metadata associated with the network traffic data or the contents associated with the network traffic data; and
    determining the network correlation index based on at least executing the sentiment analysis.

4. The system of claim 3, wherein the metadata comprises at least one of source and destination IP addresses, ports, timestamps, or protocols.

5. The system of claim 3, wherein the contents comprise information associated with a payload of network packets being transmitted in the network traffic data, wherein the information associated with a payload of network packets comprises at least one of email messages, text messages, calendar appointments, phone call transcripts, conference call transcripts, instant messages, organizational documentation, enterprise management system documentation, document repositories, virtual meetings participation, virtual meeting transcripts, physical meeting attendance documentation, and/or publications.

6. The system of claim 1, wherein the correlation criteria comprises at least one of a time element, recency of interactions, quality of interactions, frequency of interactions, number of interactions, positivity of interactions, depth of communications, consistency of communications, mutual initiatives, conflict resolution, sentiment analysis, non-verbal cues in communications, and/or skills.

7. The system of claim 1, wherein the PGMS is further configured to:
    receive, from the user input device, a feedback input specifying adjustments to at least one of the factor set or the correlation criteria;
    dynamically generate an alternate version of the data topography map with the adjusted factor set and the adjusted correlation criteria; and
    transmit control signals configured to cause the user input device to display the alternate version of the data traffic topography map.

8. A computer program product for machine learning-based metadata collection and parameterized graph modeling from communication channels, the computer program product comprising a non-transitory computer-readable medium comprising code configured to cause an apparatus to:
    receive, from a user input device, a request to query network traffic data associated with a plurality of devices, wherein the request comprises a factor set and a correlation criteria;
    analyze the network traffic data based on at least the request;
    determine a subset of the plurality of devices based on at least the request;
    generate a data traffic topography map associated with the subset of the plurality of devices; and
    transmit control signals configured to cause the user input device to display the data traffic topography map.

9. The computer program product of claim 8, wherein the code further causes the apparatus to:
    determine a network correlation index associated with the subset of the plurality of devices based on at least the correlation criteria; and
    overlay the network correlation index on the data traffic topography map.

10. The computer program product of claim 9, wherein determining the network correlation index further comprises:
    capturing metadata associated with the network traffic data;
    determining contents associated with the network traffic data;
    executing sentiment analysis on at least one of the metadata associated with the network traffic data or the contents associated with the network traffic data; and
    determining the network correlation index based on at least executing the sentiment analysis.

11. The computer program product of claim 10, wherein the metadata comprises at least one of source and destination IP addresses, ports, timestamps, or protocols.

12. The computer program product of claim 10, wherein the contents comprise information associated with a payload of network packets being transmitted in the network traffic data, wherein the information associated with a payload of network packets comprises at least one of email messages, text messages, calendar appointments, phone call transcripts, conference call transcripts, instant messages, organizational documentation, enterprise management system documentation, document repositories, virtual meetings participation, virtual meeting transcripts, physical meeting attendance documentation, and/or publications.

13. The computer program product of claim 8, wherein the correlation criteria comprises at least one of a time element, recency of interactions, quality of interactions, frequency of interactions, number of interactions, positivity of interactions, depth of communications, consistency of communications, mutual initiatives, conflict resolution, sentiment analysis, non-verbal cues in communications, and/or skills.

14. The computer program product of claim 8, wherein the code further causes the apparatus to:
   receive, from the user input device, a feedback input specifying adjustments to at least one of the factor set or the correlation criteria;
   dynamically generate an alternate version of the data topography map with the adjusted factor set and the adjusted correlation criteria; and
   transmit control signals configured to cause the user input device to display the alternate version of the data traffic topography map.

15. A method for machine learning-based metadata collection and parameterized graph modeling from communication channels, the method comprising:
   receiving, from a user input device, a request to query network traffic data associated with a plurality of devices, wherein the request comprises a factor set and a correlation criteria;
   analyzing the network traffic data based on at least the request;
   determining a subset of the plurality of devices based on at least the request;
   generating a data traffic topography map associated with the subset of the plurality of devices; and
   transmitting control signals configured to cause the user input device to display the data traffic topography map.

16. The method of claim 15, further comprising:
   determining a network correlation index associated with the subset of the plurality of devices based on at least the correlation criteria; and
   overlaying the network correlation index on the data traffic topography map.

17. The method of claim 16, wherein determining the network correlation index further comprises:
   capturing metadata associated with the network traffic data;
   determining contents associated with the network traffic data;
   executing sentiment analysis on at least one of the metadata associated with the network traffic data or the contents associated with the network traffic data; and
   determining the network correlation index based on at least executing the sentiment analysis.

18. The method of claim 17, wherein the metadata comprises at least one of source and destination IP addresses, ports, timestamps, or protocols.

19. The method of claim 17, wherein the contents comprise information associated with a payload of network packets being transmitted in the network traffic data, wherein the information associated with a payload of network packets comprises at least one of email messages, text messages, calendar appointments, phone call transcripts, conference call transcripts, instant messages, organizational documentation, enterprise management system documentation, document repositories, virtual meetings participation, virtual meeting transcripts, physical meeting attendance documentation, and/or publications.

20. The method of claim 15, wherein the correlation criteria comprises at least one of a time element, recency of interactions, quality of interactions, frequency of interactions, number of interactions, positivity of interactions, depth of communications, consistency of communications, mutual initiatives, conflict resolution, sentiment analysis, non-verbal cues in communications, and/or skills.

* * * * *